June 14, 1938.  A. P. BRUSH  2,120,238
FLASHLIGHT
Filed April 7, 1937
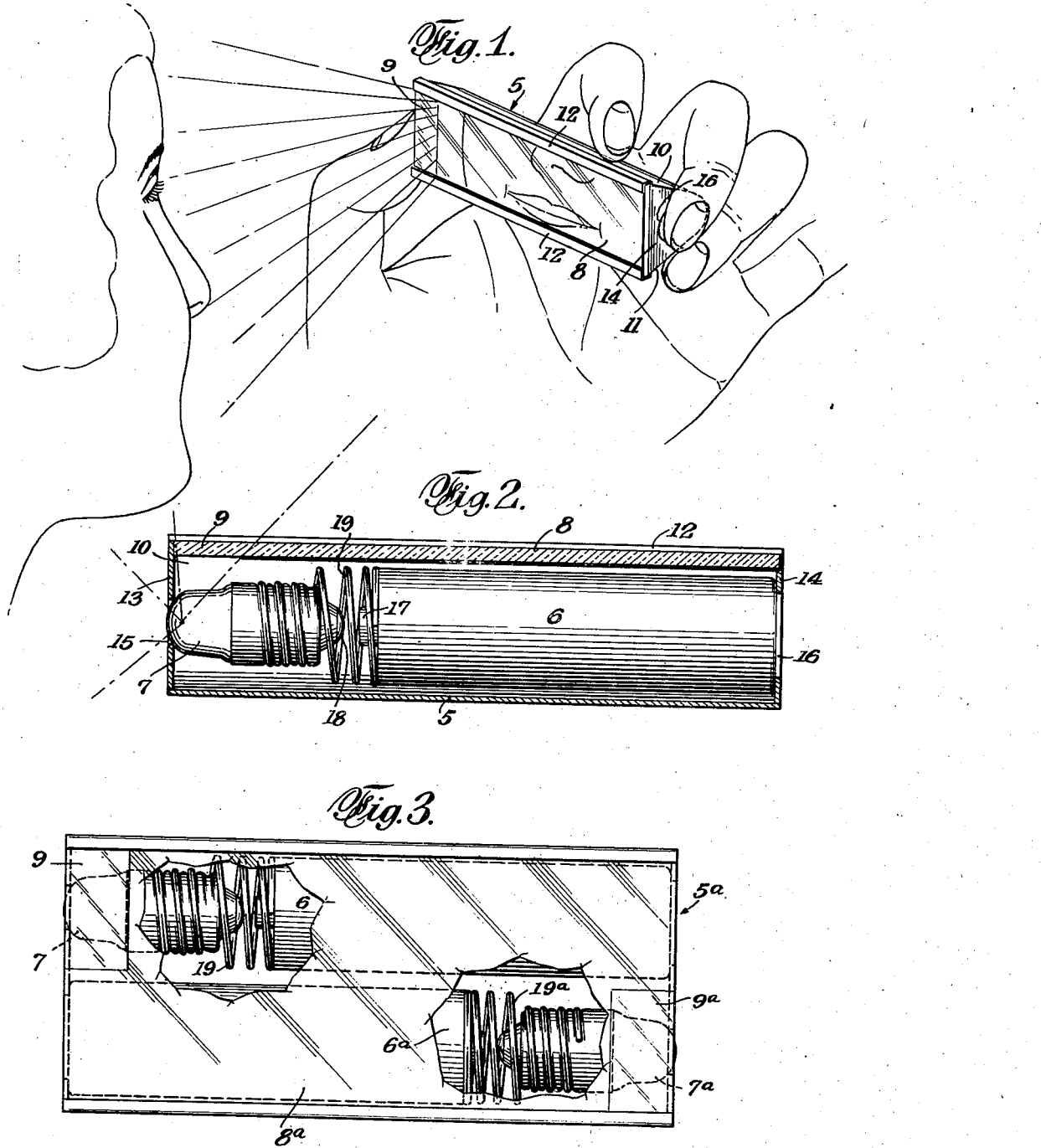
INVENTOR
ABBOTT P. BRUSH
BY
ATTORNEY Patented June 14, 1938

2,120,238

UNITED STATES PATENT OFFICE 2,120,238

FLASHLIGHT

Abbott P. Brush, Greenwich, Conn.

Application April 7, 1937, Serial No. 135,417

2 Claims. (Cl. 240—10.68)

The herein disclosed invention relates to the general class of devices known as "flashlights".

Particular objects of the invention are to provide a light, small enough to be conveniently carried in a pocketbook or the like, and which may be used to illuminate the face and show the reflection of the illuminated features, or be used as desired for ordinary flashlight purposes.

Further objects of the invention are to provide a combination illuminating mirror and flashlight as last referred to, which will be of neat attractive design and appearance and which with all the advantages mentioned, will be of a relatively inexpensive construction.

The foregoing and other desirable objects are attained in this invention by the novel features of construction, combinations and relations of parts hereinafter defined and broadly claimed.

The drawing accompanying and forming part of the following specification illustrates certain definite commercial embodiments of the invention, but as such illustrations are primarily by way of disclosure, it will be understood that structural features may be modified and changed, all within the true intent and broad scope of the invention.

Fig. 1 is a perspective view illustrating the invention as in use for illuminating the lips for make-up purposes.

Fig. 2 is an enlarged longitudinal sectional view of the light; and

Fig. 3 is a broken sectional view of a modified form of the invention.

In the embodiment illustrated in Figs. 1 and 2, the invention consists of a small casing 5, elongated to contain a dry cell 6, and small electric lamp 7, and carrying on the outside a mirror or reflector 8, forming in effect one elongated wall or side of the casing and so disposed to reflect the image of the lips or other features which may be illuminated by the light from the lamp issuing through the window 9, at one end of the mirror.

In the simple practical construction shown, the casing is substantially triangular in cross-section with two walls of the same 10, 11, formed of sheet metal folded in trough-like form to receive the dry cell and the third side formed by the mirror slipped into position or snapped into place beneath opposed inturned flanges 12, at the edges of the folded sheet metal.

The ends 13, 14, of the casing may be integral with the folded side walls of the casing and the first of these is shown as having an opening 15, receiving and positioning the end of the light globe. The other end wall 14, is shown as having an opening 16, through which the end of the dry cell may be reached to thrust the center contact 17, at the opposite end of the same into circuit closing engagement with the opposed center contact 18, of the light bulb. A spring 19, is shown for holding these parts normally relatively separated.

In this particular illustration, the mirror extends the full length of the casing and the window 9, at the end of the casing, over the light bulb is provided by an unsilvered transparent section at the end of the mirror. It is contemplated however, that this window may be provided in other ways, as by a separate piece of glass or other transparent material set in the end of the casing, or by a plain opening in the side of the casing in line with the lamp bulb, the purpose of such window being to pass light from the bulb out of the casing onto the lips or other features being viewed by reflection in the mirror. To emphasize and increase this effect, a special reflector may be located back of the globe to throw the light as much as possible out through this window at a proper angle for efficiently illuminating the features reflected in the mirror.

When using the device as in Fig. 1, to direct the light on the lips, for applying make-up, as may be indicated desirable by the lighted image shown in the reflector, the thumb may be held over the flashlight opening 15, in the end of the casing, while pressure is applied by a finger through opening 16, in the opposite end to hold the lighting circuit closed. This shuts off possibly confusing light from the end of the device and to an extent, reflects such light back into the casing for desired projection out through the window.

If desired, more than one dry cell may be provided. Fig. 3 illustrates a construction in which there are two dry cells 6, 6a, located in reverse side-by-side relation in the same casing 5a, with a single reflector or mirror 8a, having a window 9, at one end over one lamp bulb 7, and a second window 9a, at the opposite end over the other lamp bulb 7a. With this construction, either one or both lamps may be used at any time, depending upon the location, extent and amount of illumination desired.

The light openings or windows 9 and 15 in the side and in the end of the casing, enable the device to be used either for mirror or flashlight purposes. Instead of being a separate glass mirror, the reflector 8, if the casing is made of sheet metal, may be an integral wall of the casing, polished as necessary to form a suitable reflector. The generally triangular cross-sectional form of casing is desirable as providing the smallest shape which will hold the necessary dry cell and provide a reflector of sufficient width. The batteries are easily replaced by simply sliding back the reflector and removing the old cell and replacing it with a fresh one, the spring 19, acting as a resilient connection yieldingly holding the battery in place and preventing rattling of the parts. While the light opening which is not in use may be readily covered by the fingers, it is contemplated that a sliding or rotating shutter or shutters may be provided, particularly one which may be turned from one position to another to cut off one window while opening the other, the inside face of said shutter or shutters being bright to act as a reflector in the cut-off position.

Special reflectors may be provided in the casing to throw the light out through the side of the casing at an acute angle, thus to better illuminate the lips or other features directly in front of the reflector. With side windows at opposite ends of the casing as in Fig. 3, these reflectors might be arranged to direct the light beams convergently on the features or article in front of the reflector.

What is claimed is:

1. A lipstick mirror and light, comprising an elongated casing of small cross-sectional dimensions and having openings in opposite ends of the same, a small flashlight dry cell of elongated form slidingly fitting in said casing and exposed at the opening in one end of the casing for pushing movement, a lamp bulb seated in the opening in the opposite end of the casing directly opposite the other end of the dry cell, a spring normally holding said light bulb and dry cell in separated relation but yieldable to permit sliding movement of the dry cell sufficient to engage the lamp bulb to close circuit through the same, said casing having a window in one side of the same directly opposite said lamp bulb and an elongated lipstick mirror on said same side of the casing extending from said window toward the opposite end of the casing to show the image of the lips illuminated through said window when said casing is held endwise between opposing fingers closing the lamp opening in one end of the casing and pressing the dry cell at the opposite end of the casing into circuit closing engagement with the lamp bulb.

2. A combination lipstick mirror and light, comprising an elongated casing having a light window in one end and a light window in one side of the same adjacent said end, a lamp bulb within the casing back of said end and side light windows, a dry cell for said lamp bulb within the casing, means at the opposite end of the casing from said end light window for closing circuit of the dry cell through said lamp bulb and whereby the end light window may be closed and the lamp bulb be lighted by holding the casing endwise between opposed fingers of one hand, and an elongated lipstick mirror on the outside of the casing extending from the light window in the side of the casing toward the opposite end of the casing for reflecting the image of the lips illuminated through said side window when the casing is held in the fingers as described.

ABBOTT P. BRUSH.